United States Patent
Fiorati et al.

(10) Patent No.: US 10,926,588 B2
(45) Date of Patent: Feb. 23, 2021

(54) COMBINATION AIR SUPPLY SYSTEM AND METHOD

(71) Applicant: CNH Industrial America LLC, New Holland, PA (US)

(72) Inventors: Stefano Fiorati, Ferrara (IT); Eran Salzman, Glenview, IL (US); Darían E. Landolt, Evanston, IL (US)

(73) Assignee: CNH Industrial America LLC, New Holland, PA (US)

( * ) Notice: Subject to any disclaimer, the term of this patent is extended or adjusted under 35 U.S.C. 154(b) by 251 days.

(21) Appl. No.: 15/946,394

(22) Filed: Apr. 5, 2018

(65) Prior Publication Data
US 2019/0308471 A1 Oct. 10, 2019

(51) Int. Cl.
| | |
|---|---|
| *B60C 23/00* | (2006.01) |
| *B60C 23/10* | (2006.01) |
| *B62D 49/06* | (2006.01) |
| *A01B 71/02* | (2006.01) |

(52) U.S. Cl.
CPC ............ *B60C 23/003* (2013.01); *A01B 71/02* (2013.01); *B60C 23/10* (2013.01); *B62D 49/0621* (2013.01); *B60C 2200/08* (2013.01)

(58) Field of Classification Search
CPC ... B60C 23/003; B60C 23/10; B60C 2200/08; B60C 23/04; B60C 23/002; A01B 71/02; B62D 49/0621
See application file for complete search history.

(56) References Cited

U.S. PATENT DOCUMENTS

| | | | | |
|---|---|---|---|---|
| 4,418,737 A | * | 12/1983 | Goodell | B60C 23/00 137/224 |
| 4,489,988 A | * | 12/1984 | Robbins | B60B 27/02 301/108.4 |
| 5,558,730 A | * | 9/1996 | Olney | B60C 23/004 152/418 |
| 6,269,691 B1 | | 8/2001 | Sowatzke et al. | |

(Continued)

FOREIGN PATENT DOCUMENTS

GB 2471478 1/2011

*Primary Examiner* — Khoi H Tran
*Assistant Examiner* — Jorge O Peche
(74) *Attorney, Agent, or Firm* — Rickard K. DeMille; Rebecca L. Henkel (57) ABSTRACT

A combination air supply system for a work vehicle, includes a work vehicle compressor configured to be mounted on the work vehicle, wherein the work vehicle compressor is configured to compress a first supply of ambient air and to output a first compressed air supply via a compressed air line, wherein the compressed air line is configured to receive a second compressed air supply from an implement compressor via a compressed air connection line, wherein the implement compressor is configured to be mounted on an implement towed by the work vehicle, wherein the compressed air connection line is configured to couple the implement compressor to the compressed air line via a coupler, and a tire inflation system fluidly coupled to the compressed air line and configured to selectively increase and decrease an air pressure within a tire of the work vehicle, wherein the tire inflation system is configured to distribute the first compressed air supply, the second compressed air supply, and a combination air supply of the first and second compressed air supplies to the tire.

5 Claims, 3 Drawing Sheets

(56) References Cited

U.S. PATENT DOCUMENTS

| | | | | |
|---|---|---|---|---|
| 7,537,219 B1* | 5/2009 | Sherwood | ................ | B60G 3/14 |
| | | | | 280/124.116 |
| 7,963,307 B2 | 6/2011 | Rudolf et al. | | |
| 8,528,611 B2* | 9/2013 | Wilson | .................. | B60C 23/003 |
| | | | | 152/416 |
| 9,789,739 B1* | 10/2017 | Hennig | ..................... | B60S 5/04 |
| 2004/0169416 A1* | 9/2004 | Dombroski | ............. | F16C 33/76 |
| | | | | 301/105.1 |
| 2007/0182241 A1* | 8/2007 | Dombroski | ............. | B60B 27/02 |
| | | | | 301/108.1 |
| 2016/0052351 A1* | 2/2016 | Dilisio | .................. | B60C 23/003 |
| | | | | 701/36 |
| 2017/0080761 A1* | 3/2017 | King | .................... | B60C 23/003 |
| 2017/0087944 A1* | 3/2017 | King | .................... | B60C 23/003 |
| 2017/0113498 A1* | 4/2017 | King | .................... | B60C 23/002 |
| 2017/0299077 A1* | 10/2017 | Jabcon | .................... | F16K 21/06 |
| 2018/0170125 A1* | 6/2018 | Woodley | ............... | B60C 23/003 |
| 2018/0178598 A1* | 6/2018 | Woodley | ................. | B60C 23/02 |
| 2018/0223751 A1* | 8/2018 | Xiao | ....................... | B60C 23/14 |
| 2018/0236827 A1* | 8/2018 | Breneman | ............... | B60C 23/16 |
| 2018/0297422 A1* | 10/2018 | Ciovnicu | ............... | B60C 23/003 |
| 2018/0304697 A1* | 10/2018 | Woodley | ............... | B60C 23/003 |
| 2018/0312017 A1* | 11/2018 | Woodley | ............... | B60C 23/003 |
| 2018/0312018 A1* | 11/2018 | Wilson | .................. | B60C 23/002 |
| 2018/0356798 A1* | 12/2018 | Ciovnicu | ............... | B60C 23/003 |
| 2019/0308471 A1* | 10/2019 | Fiorati | .................... | B60C 23/04 |
| 2019/0366782 A1* | 12/2019 | Milburn, Jr. | ........ | B60C 23/0488 |
| 2020/0031334 A1* | 1/2020 | Woodley | ............... | B60C 23/003 |

* cited by examiner

COMBINATION AIR SUPPLY SYSTEM AND METHOD

BACKGROUND

The present disclosure relates generally to a system and method for tire inflation.

Certain work vehicles (e.g., tractors, harvesters, skid steers, etc.) are configured to operate on a variety of terrains. For example, work vehicles may be operated on roads. While the work vehicle is operating on a road, a greater tire pressure may be desired to improve efficiency and to reduce wear on the tires. Work vehicles may also be operated in fields. While the work vehicle is operating in a field, a lower tire pressure may be desired to improve traction and decrease pressure on the ground. Some work vehicles include a tire inflation system that may facilitate inflation and deflation of the tires of the work vehicle (e.g., during operation of the work vehicle) by utilizing a compressor of the work vehicle. Thus, the air pressure within the tires of the work vehicle may be adjusted based on the expected terrain. However, such tire inflation systems may be limited by the output of the compressor of the work vehicle. For example, the work vehicle may include large tires and the use of the compressor of the work vehicle to increase the air pressure within the tires may take a long time, thereby delaying the benefit of having the tires at the desired pressure. Further, operating the compressor of the work vehicle may use a large amount of fuel.

BRIEF DESCRIPTION

In one embodiment, a combination air supply system for a work vehicle, includes a work vehicle compressor configured to be mounted on the work vehicle, wherein the work vehicle compressor is configured to compress a first supply of ambient air and to output a first compressed air supply via a compressed air line, wherein the compressed air line is configured to receive a second compressed air supply from an implement compressor via a compressed air connection line, wherein the implement compressor is configured to be mounted on an implement towed by the work vehicle, wherein the compressed air connection line is configured to couple the implement compressor to the compressed air line via a coupler, and a tire inflation system fluidly coupled to the compressed air line and configured to selectively increase and decrease an air pressure within a tire of the work vehicle, wherein the tire inflation system is configured to distribute the first compressed air supply, the second compressed air supply, and a combination air supply of the first and second compressed air supplies to the tire.

In another embodiment, a combination air supply system for a work vehicle, includes a work vehicle compressor of the work vehicle, wherein the work vehicle compressor is configured to compress a first supply of ambient air and to output a first compressed air supply via a compressed air line, wherein the compressed air line is configured to receive a second compressed air supply from an implement compressor via a compressed air connection line, wherein the implement compressor is configured to be mounted on an implement towed by the work vehicle, wherein the compressed air connection line is configured to couple the implement compressor to the compressed air line via a coupler, a priority valve coupled to an output of the compressed air line and an output of the compressed air connection line, a tire inflation system fluidly coupled to the priority valve and configured to selectively increase and decrease an air pressure within a tire of the work vehicle, wherein the priority valve is configured to selectively distribute the first compressed air supply, the second compressed air supply, and a combination air supply of the first and second compressed air supplies to the tire inflation system, the tire inflation system includes a pressure valve and a distribution line extending from the priority valve and configured to extend to the tire, and the pressure valve is disposed along the distribution line and configured to control the increase and decrease of the air pressure within the tire, and a controller including a memory and a processor, wherein the controller is communicatively coupled to the priority valve and the pressure valve and configured to control distribution of the first compressed air supply, the second compressed air supply, and the combination air supply.

In another embodiment, a method, includes receiving, at a processor, a first signal indicative of a target tire pressure of a tire of a work vehicle of an agricultural system, receiving, at the processor, a second signal indicative of a current measured air pressure within the tire from a pressure sensor, determining, via the processor, whether the air pressure within the tire corresponds to the target tire pressure, determining, via the processor, whether an output of an implement compressor of an implement of the agricultural system is coupled to an output of a work vehicle compressor of the work vehicle, wherein the output of the implement compressor is coupled to the output of the work vehicle compressor via a priority valve, the priority valve is configured to distribute a first compressed air supply output from the work vehicle compressor, a second compressed air supply output from the implement compressor, and a combination compressed air supply of the first and second compressed air supplies to a tire inflation system of the work vehicle, and the tire inflation system is configured to selectively increase and decrease the air pressure within the tire, and outputting to the priority valve, via the processor, in response to determining that the air pressure within the tire does not correspond to the target tire pressure and that the output of the implement compressor is coupled to the output of the work vehicle compressor at the priority valve, a third signal indicative of an instruction to control the priority valve such that only the second compressed air supply or the combination compressed air supply is distributed to the tire inflation system.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Figure 1:
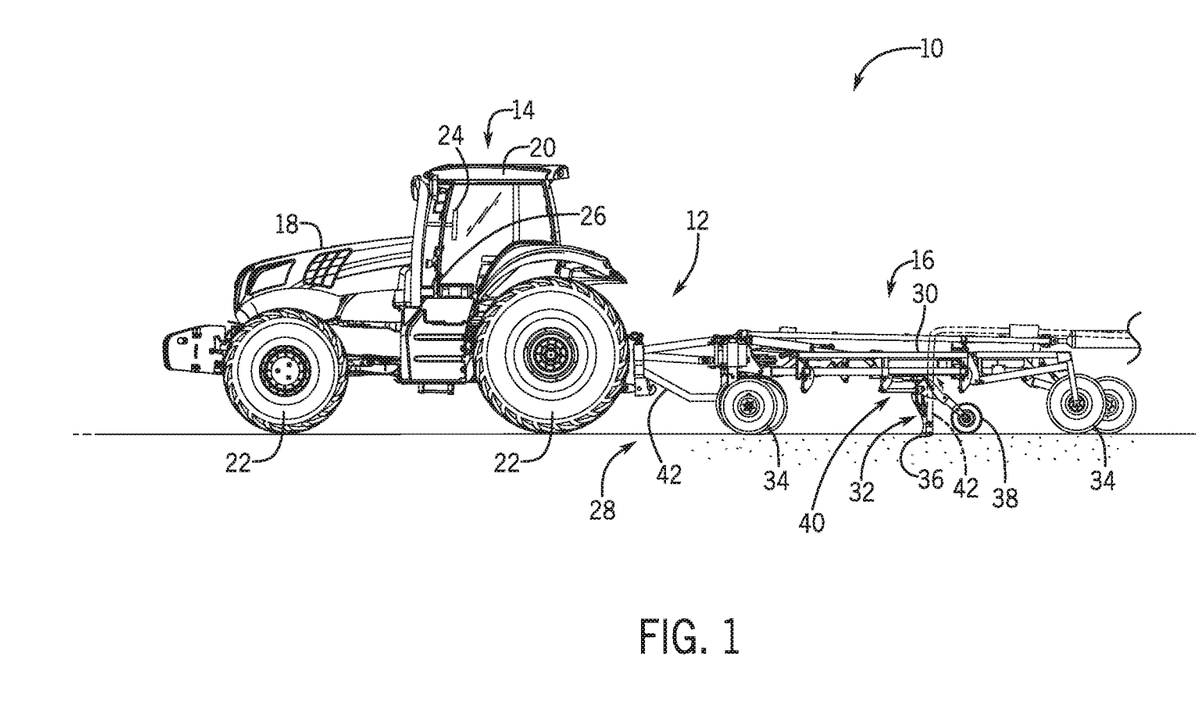
FIG. 1 is a side view of an embodiment of an agricultural system having a work vehicle and a towable implement, in which the agricultural system includes a combination air supply system.

Turning to the drawings, FIG. 1 is a side view of an embodiment of an agricultural system 10 that includes a combination air supply system 12. In the illustrated embodiment, the agricultural system 10 includes a work vehicle 14 and an implement 16. The work vehicle 14 is coupled to the implement 16 and used to tow the implement 16. While in the illustrated embodiment the work vehicle 14 is coupled to a single implement 16, in some embodiments, the work vehicle 14 may be used to tow more than one towable implement. Further, while the implement 16 is discussed as a seeding implement, the disclosed combination air supply system 12 is applicable to other implements, such as an air cart, a harvester, or any other suitable towable agricultural implement.

In the illustrated embodiment, the work vehicle 14 includes a body 18 configured to house an engine, a transmission, components of the combination air supply system 12, other systems of the work vehicle 14, or a combination thereof. Additionally, the work vehicle 14 includes a cab 20 configured to house an operator. Moreover, the work vehicle 14 includes tires 22 (e.g., mounted on wheels), including front tires and back tires, configured to be driven by a drive system coupled to the engine and/or the transmission, thereby driving the work vehicle 14 along a field, a road, or any other suitable surface. The operator may steer the work vehicle 14 by manipulating or providing an input to a hand controller 24 within the cab 20. In the illustrated embodiment, the hand controller 24 is a steering wheel. However, the work vehicle 14 may be steered by any suitable controlling device, such as an electronic controlling device located within the work vehicle 14 or remote from the work vehicle 14. Additionally, the operator may slow or stop the work vehicle 14 by manipulating or providing an input to a brake pedal 26. Furthermore, the work vehicle 14 may be configured to be remotely controlled and/or to operate autonomously. While the illustrated work vehicle 14 is a tractor, it should be appreciated that the agricultural system 10 having the combination air supply system 12 described herein may include any other suitable work vehicle, such as a truck, an automobile, a harvester, a sprayer, or a skid steer. As discussed in detail below, the combination air supply system 12 of the agricultural system 10 may control inflation, or inflation pressure, of each of the tires 22 of the work vehicle 14.

The implement 16 may be towed by the work vehicle 14. The towable implement 16 may be a seeding implement or a harvesting implement, such as an air cart, a harvester, or any other suitable towable agricultural implement. In the illustrated embodiment, the implement 16 is a seeding implement configured to deposit rows of seeds or other particulate material into the soil as the implement 16 is towed across a surface 28 of an agricultural field by the work vehicle 14. The implement 16 includes a tool frame 30 coupled to a row unit 32 (e.g., a ground engaging opener system), and wheel assemblies 34. The wheel assemblies 34 contact the surface 28 to enable the implement 16 to be towed by the work vehicle 14. As the implement 16 is towed across a field by the work vehicle 14, a row of seeds and/or particulate material may be deposited into the soil by the row unit 32. Although only one row unit 32 is shown, the implement 16 may include multiple row units 32 organized in a row across a width of the implement 16. In some embodiments, the implement 16 may include a row of 12, 14, 16, 18, 20, or more row units 32 and/or multiple rows of row units 32, each row unit 32 configured to deposit a respective row of seeds and/or particulate material.

To facilitate depositing seeds, each row unit 32 may include an opener 36, a press wheel 38, a hydraulic cylinder 40, and a seed tube 42. When the opener 36 engages the soil, the opener 36 may exert a force that excavates a trench into the soil as the row unit 32 travels through the field. In the present embodiment, a vertical position of the press wheel 38 controls the penetration depth of the opener 36, and the hydraulic cylinder 40 controls the downward force (e.g., a down pressure) applied by the press wheel 38. Seeds and/or particulate material may be deposited into the trench excavated by the opener 16 via the seed tube 42. Then, soil may fall back into the trench and the press wheel 38 may compress the soil covering the seeds.

The combination air supply system 12 may provide compressed air to a tire inflation system of the work vehicle 14, as well as provide compressed air to pneumatic components of the implement 16, such as a pneumatic conveyance system or other pneumatic components. In some embodiments, a controller of the combination air supply system 12 may be configured to control distribution of compressed air from a compressor of the implement 16 to the tire inflation system of the work vehicle 14 and to the pneumatic components of the implement 16, and in certain embodiments control distribution to the individual tires 22 of the work vehicle 14. The combination air supply system 12 may include a compressed air connection line 62 that may distribute compressed air from the compressor of the implement 16 to the tire inflation system of the work vehicle 14, as discussed in greater detail with reference to FIG. 2. In some embodiments, the tire inflation system of the work vehicle 14 may be configured to utilize only compressed air from the compressor of the implement 16 during certain phases of operation and to utilize a combination of compressed air from the compressor of the implement 16 and compressed air from a compressor of the work vehicle 14 during other phases of operation. The combination air supply system 12 may reduce fill times of the tires of the work vehicle and may improve efficiency of the tire inflation process.

Figure 2:
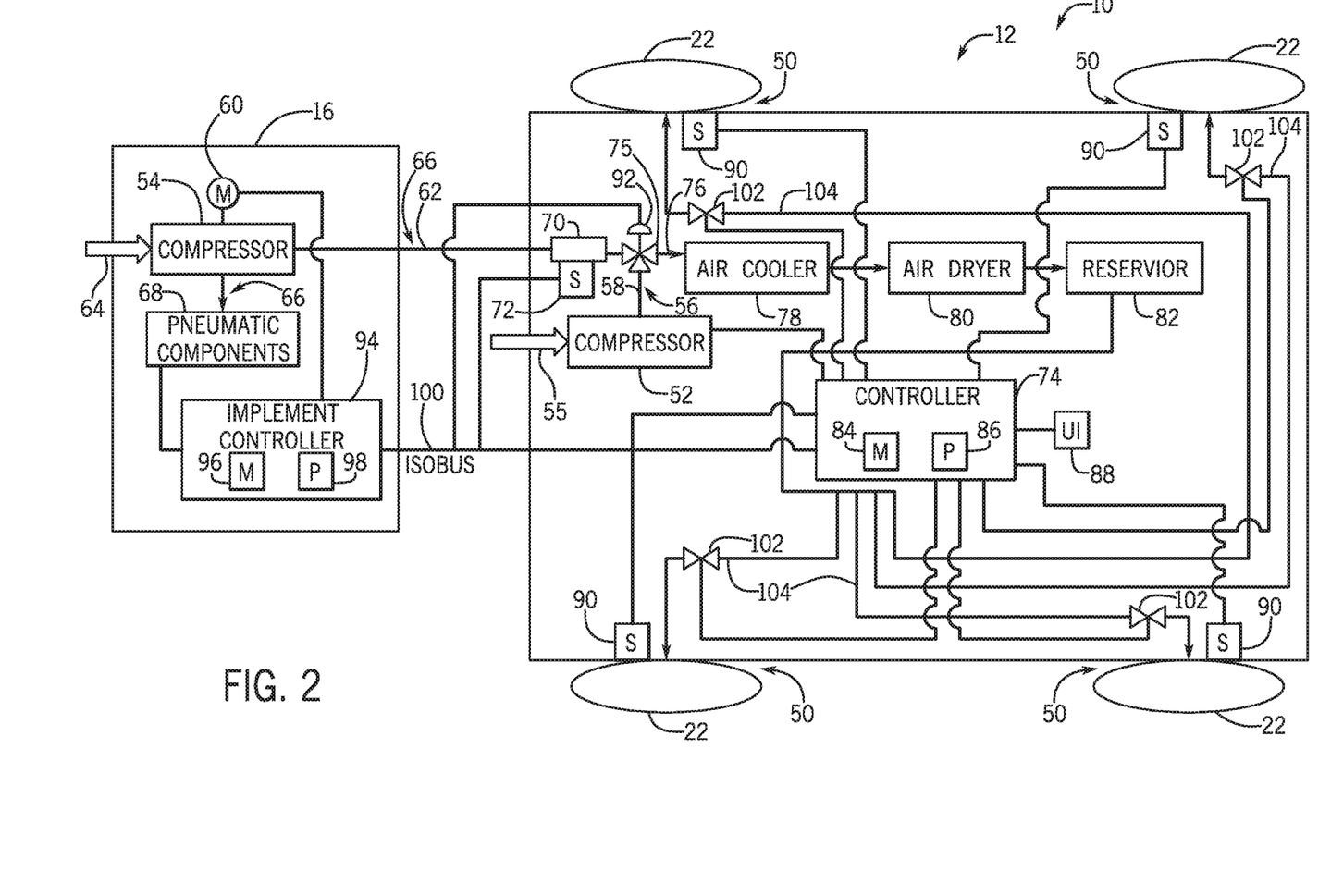
FIG. 2 is a schematic diagram of an embodiment of a combination air supply system having a tire inflation system that may be employed within the agricultural system of FIG. 1.

FIG. 2 is a schematic diagram of an embodiment of a combination air supply system 12 having a tire inflation system 50 that may be employed within the agricultural system 10 of FIG. 1. The combination air supply system 12 may include the tire inflation system 50, which may supply air to the tires 22 of the work vehicle 14. The combination air supply system 12 includes a work vehicle compressor 52 and an implement compressor 54. The work vehicle compressor 52 may be driven by the engine of the work vehicle 14 (e.g., and controlled by a clutch positioned between the engine and the compressor). In some embodiments, the work vehicle compressor 52 may be water cooled. The work vehicle compressor 52 may receive ambient air 55 at atmospheric pressure, compress the air, and output compressed air 56 at a higher pressure and a lower volume. The compressed air 56 may then be used to increase tire pressure of the tires 22 of the work vehicle via the tire inflation system 50. In some embodiments, the work vehicle compressor 52 may also supply compressed air to other pneumatic systems of the work vehicle 14, such as a pneumatic brake system of the work vehicle. The work vehicle compressor 52 may output the compressed air 56 via a compressed air line 58. In some embodiments, a check valve may be positioned along the compressed air line 58 to block the air flow back toward the work vehicle compressor 52.

In the illustrated embodiment, the combination air supply system 12 includes the implement compressor 54. The implement compressor 54 may be driven by a motor 60 (e.g., hydraulic motor, electric motor), and may be an air cooled compressor. The implement compressor 54 may have a similar capacity to the work vehicle compressor 52. The output of the implement compressor 54 is coupled to the compressed air line 58 via a compressed air connection line 62. The implement compressor 54 may receive additional ambient air 64 at atmospheric pressure, compress the air, and output compressed air 66 at a higher pressure and a lower volume. The compressed air 66 may be delivered to the work vehicle 14 via the compressed air connection line 62, where the compressed air 66 from the implement compressor 54 may be used as an alternate and/or supplementary compressed air supply for the tire inflation system 50. As an alternate compressed air supply, the compressed air 66 from the implement compressor 54 may increase fuel efficiency of the work vehicle 14. For example, as the work vehicle compressor 52 may be controlled by a clutch, the capacity of the work vehicle compressor 52 may be reduced with the clutch when using the implement compressor 54, thus, saving fuel. As a supplemental compressed air supply, the compressed air 66 from the implement compressor 54 may increase the volumetric flow rate of air within the combination air supply system 12 (e.g., as compared to only the output of the work vehicle compressor 52), which may in turn decrease inflation time of the individual tires 22 of the work vehicle 14 via the tire inflation system 50. The compressed air 66 output from the implement compressor 54 may also be used by pneumatic components 68 of the implement 16.

The compressed air connection line 62 may deliver the compressed air 66 from the implement compressor 54 to the tire inflation system 50 of the work vehicle 14. The compressed air connection line 62 may be coupled to the compressed air line 58 via a coupler 70 (e.g., quick coupler). The coupler 70 may establish an efficient connection between the output of the implement compressor 54 and the output of the work vehicle compressor 52 while the implement 16 is being towed by the work vehicle 14. The coupler 70 may include a connection sensor 72 that may be used to identify when the compressed air connection line 62 from the implement compressor 54 is coupled to the compressed air line 58. The connection sensor 72 may send a signal to a controller 74, which may be a work vehicle controller or other suitable controller, indicative of whether the compressed air connection line 62 from the implement compressor 54 is coupled to the compressed air line 58, as discussed in greater detail below. The compressed air connection line 62 may be coupled to the compressed air line 58 via a priority valve 75. The priority valve 75 may enable only the compressed air 56 from the work vehicle compressor 52, only the compressed air from the implement compressor 54, or a combination of the compressed air 56 from the work vehicle compressor 52 and the compressed air 66 from the implement compressor 54 to be delivered to the tire inflation system 50. The priority valve may output the compressed air 56, 66 from either the work vehicle compressor 52 or the implement compressor 54, or the combination of the two compressed air supplies to the tire inflation system 50 via a line 76.

The line 76 may deliver the compressed air 56, the compressed air 66, or the combination of the two compressed air supplies from the priority valve 75 to an air cooler 78 (e.g. radiator) of the combination air supply system 12. Compressing the ambient air 55, 64 via the work vehicle compressor 52 and the implement compressor 54, respectively, may increase the temperature of the compressed air 56 output from the work vehicle compressor 52 into the compressed air line 58 and the compressed air 66 output from the implement compressor 54 into the compressed air connection line 62. The temperature of the air when it is compressed may increase, for example, to around 250 degrees C. To reduce the temperature of the compressed air 56, 66 or the combination of the two compressed air supplies for use in the tire inflation system 50, the compressed air 56, 66 from the line 76 output from the priority valve 75 may be directed through the air cooler 78. The air cooler 78 may include any suitable type of cooling assembly or heat exchanger. For example, the air cooler 78 may be include radiator which cools the compressed air 56, 66 via heat exchange between coolant and/or ambient air and the compressed air 56, 66. The heat exchange reduces the temperature of the compressed air 56, 66 or the combination of the two compressed air supplies.

After the compressed air 56, 66 or the combination of the two compressed air supplies in sufficiently cooled, the compressed air 56, 66 may be delivered to an air dryer 80 of the combination air supply system 12. The process of air compression within the work vehicle compressor 52 and/or the implement compressor 54 may also concentrate any water vapor present, which may lead to condensation within the lines of the combination air supply system 12 as the compressed air 56, 66 cools downstream of the work vehicle compressor 52 and/or the implement compressor 54, for example at the air cooler 78. The air dryer 80 (e.g., compressed air dryer) may remove water vapor from the compressed air 56, 66. Thus, the air dryer 80 may remove moisture to substantially reduce or eliminate condensation from occurring within the combination air supply system 12. In some embodiments, after moisture present in the compressed air 56, 66 has been removed by the air dryer 80, the compressed air 56, 66 or the combination of the two compressed air supplies may be delivered to a reservoir 82. The reservoir 82 may store the compressed air 56, 66 for use by the tire inflation system 50. In some embodiments, the combination air supply system may not include the air cooler and/or the air dryer.

The combination air supply system 12 includes the controller 74 that may be used to control distribution and delivery of the compressed air 56, 66. The controller 74 may control distribution and delivery of the compressed air 56 from the work vehicle compressor 52 and the compressed air 66 from the implement compressor 54 to the tire inflation system 50, and in certain embodiments, between individual tires 22 of the work vehicle 14. The controller 74 includes a memory 84 and a processor 86. In some embodiments, the memory 84 may include one or more tangible, non-transitory, computer-readable media that store instructions executable by the processor 86 and/or data to be processed by the processor 86. For example, the memory 84 may include access memory (RAM), read only memory (ROM), rewritable non-volatile memory such as flash memory, hard drives, optical discs, and/or the like. Additionally, the processor 86 may include one or more general purpose microprocessors, one or more application specific processors (ASICs), one or more field programmable logic arrays (FPGAs), or any combination thereof. The combination air supply system 12 may further include a user interface 88 or input/output (I/O) devices that may facilitate communication between the controller 74 and a user (e.g., operator). The user interface 88 may be disposed within the cab of the work vehicle 14 or at a remote location in the case of a remotely controlled or autonomously operated work vehicle 14. For example, the user interface 88 may include a button, a keyboard, a mouse, a trackpad, and/or the like to enable user interaction with the controller 74. Additionally, the user interface 88 may include an electronic display to facilitate providing a visual representation of information, for example, via a graphical user interface (GUI), an application interface, text, a still image, and/or video content.

In operation, the controller 74 may receive various input signals from sensors throughout the combination air supply system 12 and/or other components of the work vehicle 14 and the implement 16 at the processor 86. In some embodiments, these input signals and/or control signals (e.g., instruction signals) output by the controller 74 may be stored in the memory 84. The input signals may be utilized individually or in various combinations to determine current usage of the compressed air 66 from the implement compressor 54 based at least in part on signals received from a controller of the implement 16 and/or sensors about the implement indicative of use of the pneumatic components, connection of the implement compressor 54 to the compressed air line 58 via the compressed air connection line 62 at the coupler 70, and current tire pressure of the individual tires 22 of the work vehicle 14 based at least in part on signals received from pressure sensors at each tire 22. The controller 74 may further receive input signals from the user (e.g., operator) via the user interface 88 indicative of a target pressure of each tire 22 of the work vehicle 14. Additionally, the controller 74 may receive input signals indicative of coupling the compressed air connection line 62 to the compressed air line 58 via the coupler 70 and a current usage of the compressed air 66 output from the implement compressor 54 via the controller of the implement and/or sensors throughout the pneumatic components of the implement 16. The controller 74 may then output various instruction signals to valves and/or actuators of the combination air supply system 12 to control deliver of the compressed air 66 output from the implement compressor 54 and/or the compressed air 56 output from the work vehicle compressor 52 to the tire inflation system 50 and to individual tires 22 of the work vehicle 14 to achieve a target pressure within each tire 22. The user interface 88 may send signals indicative of the target pressure of each tire 22 to the controller 74 based on input from the operator (e.g., based at least in part on a particular terrain on which the work vehicle is currently driving and/or a load being towed by the work vehicle 14).

The controller 74 may receive one or more signals indicative of the current measured pressure of each tire 22 of the work vehicle 14 via pressure sensors 90. The pressure sensors 90 may be disposed at each tire 22 of the work vehicle 14 and measure the current pressure within each tire 22. Each pressure sensor 90 may send signal(s) indicative of the current pressure within a respective tire 22 to the controller 74. The controller 74 may output one or more signals to the user interface 88 indicative of the measured tire pressure of each tire 22 of the work vehicle 14. Via the user interface 88, the operator positioned within the cab of the work vehicle 14 or positioned remotely may view the measured tire pressure within each tire 22. Based at least in part on the current terrain and/or the load being pulled by the work vehicle 14, the operator may input to the controller 74, via the user interface 88, the target pressure for each tire 22 of the work vehicle 14. In some embodiments, the controller 74 may determine the target pressure of each tire 22 of the work vehicle 14 based at least in part on input signals (e.g., from the user interface 88, from load sensors, from terrain sensors, etc.) indicative of the terrain and/or or the load being towed. Based on the received or determined target pressure of each tire 22 of the work vehicle 14, the controller 74 may compare the current pressure of each tire 22 to the target pressure of each tire 22 and may determine whether to inflate or deflate each individual tire 22 such that the tire pressure corresponds to the target pressure.

As previously discussed, the combination air supply system 12 may supply the compressed air 56 output from the work vehicle compressor 52, the compressed air 66 output from the implement compressor 54, or a combination of the two compressed air supplies to the tire inflation system 50. The compressed air 66 output from the implement compressor 54 may also be used to inflate tires of the implement 16 and for the other pneumatic components 68 of the implement 16. When the compressed air connection line 62 is coupled to the coupler 70 and the compressed air 66 output from the implement compressor 54 is not being used for the pneumatic components 68 of the implement 16, the controller 74 may give priority to the compressed air 66 output from the implement compressor 54. That is, the controller 74 may cause the compressed air 66 output from the implement compressor to be distributed to the tire inflation system 50 for use in varying the pressure within the tires 22 of the work vehicle 14, while reducing or termination the flow of the compressed air 56 output from the work vehicle compressor 52 to the tire inflation system 50. In addition, the controller 74 may give priority to the combination of the compressed air supplies over only the compressed air 56 output from the work vehicle compressor 52. As such, the combination air supply system 12 includes the priority valve 75 disposed at the connection of the compressed air line 58, the compressed air connection line 62, and the line 76 extending to the air cooler 78. The priority valve 75 may be a three way valve or other suitable valve that may give priority to the compressed air 66 output from the implement compressor and/or the combination of the two compressed over only the compressed air 56 output from the work vehicle compressor 52.

The controller 74 may receive a signal from the connection sensor 72 at the coupler 70 when the compressed air connection line 62 from the implement compressor 54 is coupled to the compressed air line 58. Demand of the pneumatic components 68 of the implement 16 that is low enough or below a threshold demand level may enable the implement compressor 54 to have excess capacity and may enable mixing of the compressed air supplies based on demand of the pneumatic components 68 of the implement 16. As such, if the demand of the pneumatic components 66 using the compressed air 66 output from the implement compressor 54 is below a threshold demand level, the controller 74 may output a control signal to an actuator 92 of the priority valve 75 indicative of instructions to move the priority valve 75 to a position that only enables flow of the compressed air 66 output from the implement compressor 54 to the tire inflation system 50 or to a position that enables flow of both the compressed air 66 from the implement compressor 54 and the compressed air 56 output from the work vehicle compressor 52 to the tire inflation system 50. If the demand of the pneumatic components 68 using the compressed air 66 output from the implement compressor 54 is above the threshold demand level or the compressed air connection line 62 is not coupled to the compressed air line 58, the controller 74 may output a control signal to the actuator 92 of the priority valve 75 indicative of instructions to move the priority valve 75 to a position that enables flow of only the compressed air 56 output from the work vehicle compressor 52 to the tire inflation system 50. Therefore, when the pneumatic components 68 of the implement 16 are in use such that demand for the compressed air 66 is above the threshold demand level, the work vehicle 14 is not towing the implement 16, or the output of the implement compressor 54 is not connected to the work vehicle 14, the priority valve 75 may enable only the compressed air 56 output from the work vehicle compressor 52 to be used in the tire inflation system 50.

When the demand of the pneumatic components 68 using the compressed air 68 output from the implement compressor 54 is below the threshold demand level (e.g., the pneumatic components 66 are only using a portion of the compressed air 66 or the pneumatic components 68 are not in use), the controller 74 may cause the compressed air 66 output from the implement compressor 54 or a combination of the compressed air 66 output from the implement compressor 54 and the compressed air 56 output from the work vehicle compressor 52 to flow to the tire inflation system 50 for use in varying the pressure of the tires 22, such that the tire pressure corresponds to the input or determined target pressure. The controller 74 may determine that demand of the pneumatic components 68 of the implement 16 is below the threshold demand level based at least in part on a signal received from (or a lack of signal from) an implement controller 94 indicative of current usage of the pneumatic components 68 of the implement 16 or signals received from (or a lack of signal from) sensors of the pneumatic components 68 themselves indicative of current usage of the pneumatic components 68. If the controller 74 determines that demand of the pneumatic components 68 of the implement 16 is below the threshold demand level, the controller 74 may, upon receiving an input signal indicative of the target pressure of the tires 22, control the priority valve 75 to enable the compressed air 66 output from the implement compressor 54 or a combination of the compressed air 66 output from the implement compressor 54 and the compressed air 56 output from the work vehicle compressor 52 to be distributed to the tire inflation system 50 to inflate the tires 22. When the implement compressor 54 is used to inflate the tires 22 of the work vehicle 14, the controller 74 may reduce capacity of the work vehicle compressor 52 (e.g., by reducing engagement of a clutch between the engine of the work vehicle 14 and the work vehicle compressor 52), which may save fuel. Additionally, capacity of the implement compressor 54 may be controlled base on demand from the pneumatic components 68 of the implement 16 and/or the tire inflation system 50.

The implement controller 94 may include a memory 96 and a processor 98. In some embodiments, the memory 96 may include one or more tangible, non-transitory, computer-readable media that store instructions executable by the processor 98 and/or data to be processed by the processor 98. For example, the memory 96 may include access memory (RAM), read-only memory (ROM), rewritable non-volatile memory such as flash memory, hard drives, optical discs, and/or the like. Additionally, the processor 98 may include one or more general purpose microprocessors, one or more application specific processors (ASICs), one or more field programmable logic arrays (FPGAs), or any combination thereof. The implement controller 94 may be communicatively coupled to the pneumatic components 68 of the implement and to the implement compressor 54. The implement controller 94 may also be communicatively coupled via an ISOBUS 100 to the controller 74, which may be disposed on the work vehicle 14 or remote from the agricultural system 10. As such the implement controller 94 may output signals to the controller 74 indicative of the current usage of the compressed air 66 output from the implement compressor 54 for the pneumatic components 68 of the implement 16.

In some embodiments, the controller 74 may cause the pressure within each tire 22 of the work vehicle 14 individually. In the illustrated embodiment, the combination air supply system 12 includes several pressure valves 102 disposed along respective distribution lines 104 that are configured to direct the compressed air 66 output from the implement compressor 54, the compressed air 56 output from the work vehicle compressor 52, or the combination of the two compressed air supplies to each individual tire 22. There may be one pressure valve 102 disposed along each distribution line 104 to control air flow to and from the corresponding tire 22 to increase or decrease the pressure within the tire 22. In other embodiments, the combination air supply system 12 may include only one pressure valve 102 that controls air flow to all tires 22 or several pressure valves 102 that control air flow to groups of tires 22. When the target pressure is received by the controller 74 from the user interface 88 or determined by the controller 74 based on other input signals (e.g., from the user interface 88, from load sensors, from terrain sensors, etc.), the controller 74 may compare the current measured pressure of each tire 22 to the target pressure(s) (e.g., one target pressure for all tires 22 or one target pressure for each tire 22). As previously discussed, the controller 74 may determine the current pressure of each tire 22 based on signals received from pressure sensors 90 disposed at the tires 22 indicative of the current measured pressure within each tire 22. If the controller 74 determines that the current measured pressure of an individual tire 22 does not correspond to the target pressure, the controller 74 may send a control signal to the corresponding pressure valve 102 to increase or decrease the pressure within the tire 22 based on the comparison until the current pressure of the tire 22 reaches the target pressure. Thus, the controller 74 may cause the air pressure within each tire 22 to correspond to the target pressure. In some embodiments, if the target pressure is lower than the current pressure of the tire 22, the controller 74 may cause air to be released from the tire 22.

As an example, if the work vehicle 14 is being driven onto a field from a road, the target pressure of the tires 22 may be lower than the current pressure of the tires 22. The lower tire pressure in the field may enable greater tire contact with the ground, improve traction, increase fuel efficiency, and/or reduce ground pressure on the roots of the plants in the field.

The controller 74 may receive one or more input signals (e.g., from the operator of the work vehicle 14 via the user interface 88) indicative of the target pressure, the terrain, the towed load, or a combination thereof. In some embodiments, the target tire pressure may be determined based on a terrain map and a current position of the agricultural system 10 received from a global positioning system (GPS) of the agricultural system 10. In some embodiments, input signals received from the user interface 88 may be indicative of a request to increase or decrease the pressure of one or more individual tires 22 of the work vehicle. The controller 74 may also receive signals from the pressure sensors 90 associated with the tires 22 indicative of the current measured pressure of each tire 22. The controller 74 may compare the current measured pressure of each tire 22 to the received or determined target pressure (e.g., determined based on the terrain, the towed load, etc.). If the controller 74 determines that the current pressure of a tire 22 is greater than the target pressure, the controller 74 may output signal (s) to the pressure valve 102 associated with the tire 22 indicative of an instruction to control the pressure valve 102 such that air is released from the tire 22 until the pressure of the tire 22 substantially corresponds to the target pressure (e.g., until the difference between the measured tire pressure and the target pressure is less than a threshold value). This process may be repeated for each tire, or the tire pressure for all or some of the tires may be adjusted concurrently. Signals from the pressure sensors 90 associated with the tires 22 indicative of the measured pressures may provide feedback to the controller 74 such that the controller 74 may determine when the target pressure is reached within each tire 22. When the controller 74 determines that the pressure in each tire 22 corresponds to the target pressure (e.g., the respective target pressure for each tire), the controller 74 may output instruction signals to the close the corresponding pressure valves 102.

As another example, if the work vehicle 14 is being driven onto a road from a field, the target pressure of the tires 22 may be greater that the current pressure of the tires 22. The higher tire pressure on the road may improve fuel efficiency, improve wear on the tires 22, and/or improve the ride of the work vehicle. The controller 74 may receive one or more input signals (e.g., from the operator of the work vehicle 14 via the user interface 88) indicative of the target pressure, the terrain, the towed load, or a combination thereof. In some embodiments, the target tire pressure may be determined based on a terrain map and a current position of the agricultural system 10 received from a global positioning system (GPS) of the agricultural system 10. In some embodiments, input signals received from the user interface 88 may be indicative of a request to increase or decrease the pressure of one or more individual tires 22 of the work vehicle 14. The controller 74 may also receive signals from the pressure sensors 90 associated with the tires 22 indicative of the current measured pressure of each tire 18. The controller 74 may compare the current measured pressure of each tire 22 to the received or determined target pressure (e.g., determined based on the terrain, the towed load, etc.). If the controller 74 determines that the current pressure of a tire 22 is lower than the target pressure, the controller 74 may then determine whether the output of the implement compressor 54 is coupled to the output of the work vehicle compressor 52 via the compressed air connection line 62 and the coupler 70 and whether the demand for the compressed air 66 output from the implement compressor 54 by the pneumatic components 68 of the implement 16 is below the threshold demand level, as previously discussed.

If the controller 74 determines that the output of the implement compressor 54 is coupled to the output of the work vehicle compressor 52 via the compressed air connection line 62 and the coupler 70 and the demand from the pneumatic components 68 for the compressed air 66 is below the threshold demand level, the controller 74 may output a signal to the priority valve 75 indicative of an instruction to control the priority valve 75 such that the compressed air 66 output from the implement compressor 54 or the combination of the compressed air 66 output from the implement compressor 54 and the compressed air 56 output from the work vehicle compressor 52 is distributed to the tire inflation system 50. If the controller 74 determines that the output of the implement compressor 54 is coupled to the output of the work vehicle compressor 52 via the compressed air connection line 62 and the coupler 70, but the demand from the pneumatic components 68 of the implement 16 for the compressed air 66 is greater than the threshold demand level, the controller 74 may output a signal to the priority valve 75 indicative of an instruction to control the priority valve 75 such that only the compressed air 56 output from the work vehicle compressor 52 is distributed to the tire inflation system 50. The controller 74 may also output one or more control signals to the pressure valves 102 along the distribution lines 104 to control the pressure valves 102 such that the compressed air 66 output from the implement compressor 54, the compressed air 56 output from the work vehicle compressor, or the combination of the two compressed air supplies is delivered to the corresponding tires 22 to increase the pressure within the tires 22 to substantially correspond to the target pressure(s).

This process may be repeated for each tire 22, or the tire pressure may be adjusted for all or some of the tires 22 concurrently. As previously discussed, signals from the pressure sensors 90 associated with the tires 22 indicative of the measured pressures may provide feedback to the controller 74 such that the controller 74 may determine when the target pressure is reached within each tire 22. When the controller 74 determines that the pressure in each tire 22 corresponds to the target pressure (e.g., the respective target pressure for each tire), the controller 74 may output instruction signals to the control the corresponding pressure valves 102 to close. In some embodiments, the tire inflation system may additionally be used to inflate the tires of the implement using the compressed air 66 output from the implement compressor 54, the compressed air 56 output from the work vehicle compressor 52, and/or the combination of the compressed air 66 output form the implement compressor and the compressed air 56 output from the work vehicle compressor 52.

Figure 3:
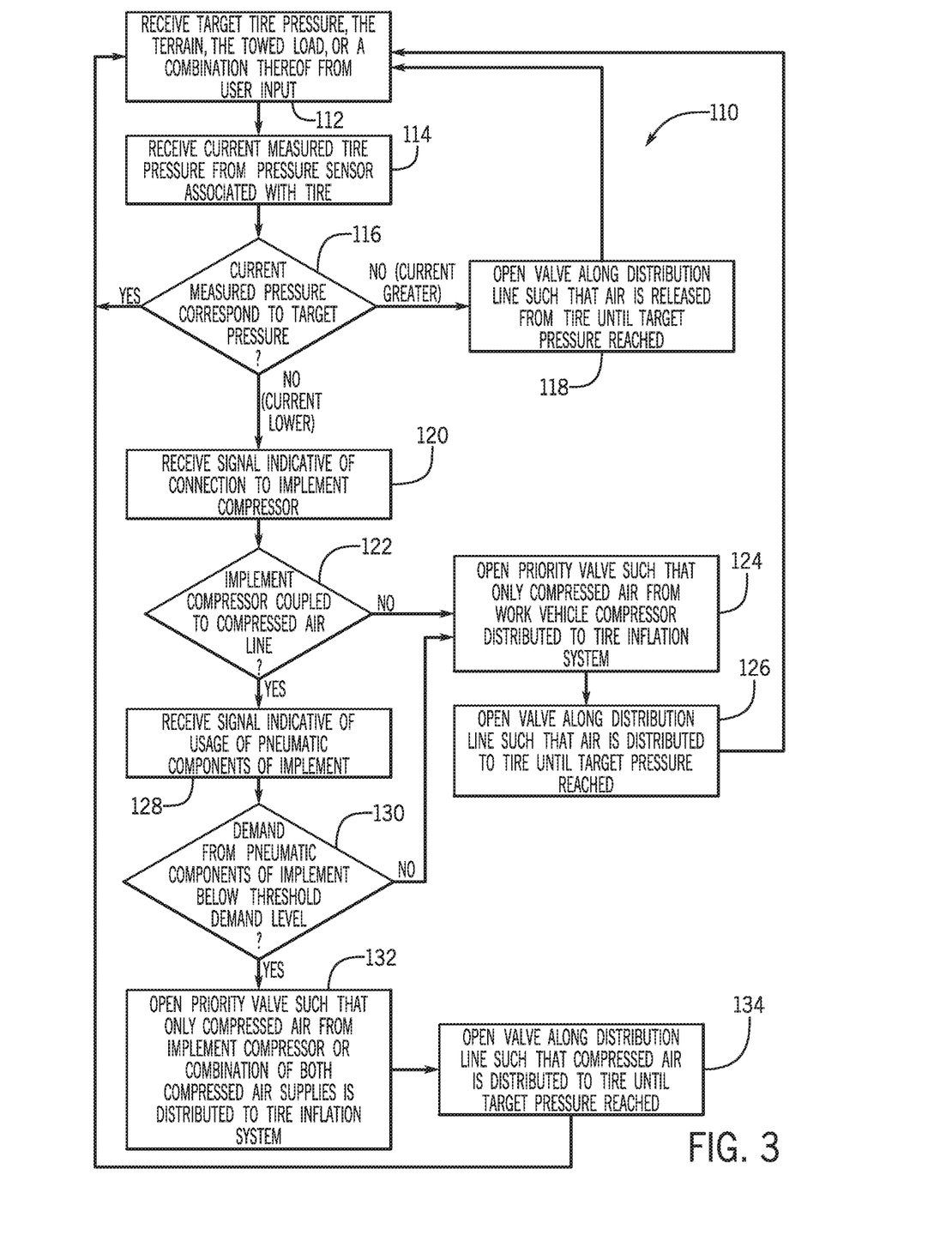
FIG. 3 is a flow diagram of an embodiment of a method for tire inflation utilizing the combination air supply system of FIG. 2.

FIG. 3 is a flow chart for a method 110 for utilizing the combination air supply system to control air pressure within the tires of the work vehicle of the agricultural system of FIG. 1. At step 112, the controller of the combination air supply system may receive one or more input signals (e.g., from the operator of the work vehicle via the user interface) indicative of the target pressure, the terrain, the towed load, or a combination thereof. In some embodiments, input signals received from the user interface may be indicative of a request to increase or decrease the pressure of one or more individual tires of the work vehicle. Next, at step 114, the controller may receive signals from the pressure sensors associated with the tires indicative of the current measured pressure of each tire of the work vehicle. Next, at step 116, the controller may compare the current measured pressure of each tire to the received or determined target pressure (e.g., determined based on the terrain, the towed load, etc.). If the current measured pressure of each tire corresponds (e.g., difference is less than a threshold) to the target tire pressure, the method 110 may return to step 112. If the current measured pressure of a tire does not correspond (e.g., difference is greater than a threshold) to the target pressure such that the current measured pressure is greater that the target pressure, at step 118, the controller may output a signal indicative of an instruction to control the valve along the distribution line to the tire such that air is released from the tire until the target pressure is achieved.

If the current measured pressure of the tire does not correspond to the received or determined target pressure such that the current measured pressure is lower than the target pressure, the controller may determine which compressed air supply may be used to increase the air pressure within the tire. At step 120, the controller may receive a signal from the connection sensor at the coupler indicative of a connection of the output of the implement compressor to the output of the work vehicle compressor via the compressed air connection line at the coupler. At step 122, the controller may determine based at least in part on the signal received from the connection sensor, whether the compressed air connection line from the implement compressor is coupled to the compressed air line such that the compressed air output from the implement compressor may be distributed to the work vehicle. If the controller determines that the compressed air connection line is not coupled to the coupler, and therefore the output of the implement compressor is not coupled to the compressed air line, at step 124, the controller may output a signal indicative of an instruction to control the priority valve disposed at the output of the work vehicle compressor such that the compressed air output from the work vehicle compressor is distributed to the tire inflation system of the work vehicle. Additionally, the controller may control the capacity of the work vehicle compressor (e.g., with the clutch) such that the capacity is increased to provide the compressed air needed. Next, at step 126, the controller may output a signal to the valve disposed along the distribution line to the tire indicative of instructions to open such that the compressed air may be used to increase the air pressure within the tire until the air pressure reaches the target pressure. As previously discussed, signals received by the controller from the pressure sensor associated with the tire indicative of the measured pressure within the tire may be used by the controller as feedback to determine when the target pressure has been achieved.

If the controller determines, at step 122, that the compressed air connection line is coupled to the coupler, and therefore the output of the implement compressor is coupled to the compressed air line, the controller may then determine the demand from pneumatic components of the implement for the compressed air output from the implement compressor. At step 128, the controller may receive, or stop receiving, one or more signals from the implement controller or the pneumatic components indicative of a current usage of the pneumatic components of the implement. At step 130, the controller may determine whether the demand from the pneumatic components of the implement for the compressed air output from the implement compressor based at least in part on the signals, or lack of signals, from the implement controller and/or the pneumatic components of the implement. If the controller determines that the demand from the pneumatic components of the implement is greater than the threshold demand level, and therefore a majority of the compressed air output from the implement compressor is being used by the pneumatic components of the implement, the controller, at step 124, may output a signal indicative of an instruction to control the priority valve disposed at the output of the work vehicle compressor such that the compressed air output from the work vehicle compressor is distributed to the tire inflation system of the work vehicle. Next, at step 126, the controller may output a signal to the valve disposed along the distribution line to the tire indicative of instructions to open, such that the compressed air may be used to increase the air pressure within the tire until the air pressure reaches the target pressure. As previously discussed, signals received by the controller from the pressure sensor associated with the tire indicative of the measured pressure within the tire may be used by the controller as feedback to determine when the target pressure has been achieved.

If, at step 130, the controller determines that the demand of the pneumatic components of the implement is below the threshold demand level, at step 132, the controller may output a signal indicative of an instruction to the priority valve disposed at the connection of the compressed air connection line from the implement compressor and the compressed air line from the work vehicle compressor such that only the compressed air output from the implement compressor or a combination of the compressed air output from the implement compressor and the compressed air output from the work vehicle compressor is distributed to the tire inflation system. Use of only the compressed air output from the implement compressor for tire inflation may save fuel, as the controller may reduce the capacity of the work vehicle compressor via the clutch when the work vehicle compressor is not being used for tire inflation and/or enable the work vehicle compressor to be used for other operations. Use of the combination of the two compressed air supplies may allow for decreased inflation time as combining the two compressed air supplies may increase the total volumetric air flow rate supplied by the combination air supply system to the tires of the work vehicle. Next, at step 134, the controller may output a signal to the valve disposed along the distribution line to the tire indicative of instructions to open, such that the compressed air may be used to increase the air pressure within the tire until the air pressure reaches the target pressure. As previously discussed, signals received by the controller from the pressure sensor associated with the tire indicative of the measured pressure within the tire may be used by the controller as feedback to determine when the target pressure has been achieved. In some embodiments, the method 110 and the tire inflation system may additionally be used to inflate the tires of the implement using the compressed air supply output from the implement compressor, the compressed air supply output from the work vehicle compressor, and/or the combination air supply.

The combination air supply system including the tire inflation system may enable individualized control of the pressure within each tire of the work vehicle (e.g., based on the terrain and/or a load being pulled by the work vehicle). Such control of the pressure of the tires may increase fuel efficiency of the work vehicle, improve wear on the tires of the work vehicle, improve traction of the tires on varying terrain, improve plant growth by reducing ground pressure when in a field, improve the ride of the work vehicle, and/or improve towing efficiency when towing varied loads. Further, the compressed air connection line coupling the output of the implement compressor to the output for the work vehicle compressor may enable compressed air from the implement to be used as an alternative and/or supplementary source of compressed air for tire inflation. Thus, connection of the output of the implement compressor to the work vehicle air system and use of compressed air supplies from the both the implement compressor and the work vehicle compressor may increase the total volumetric air flow rate supplied by the air supply system to the tires, which may in turn, decrease fill time of the tires. Additionally, use of the compressed air supply from the implement compressor for tire inflation may reduce a load on the work vehicle compressor, which may increase fuel efficiency of the work vehicle.

While only certain features have been illustrated and described herein, many modifications and changes will occur to those skilled in the art. It is, therefore, to be understood that the appended claims are intended to cover all such modifications and changes as fall within the true spirit of the disclosure.

The invention claimed is:

1. A combination air supply system for a work vehicle, comprising:
    a work vehicle compressor configured to be mounted on the work vehicle, wherein the work vehicle compressor is configured to compress a first supply of ambient air and to output a first compressed air supply via a compressed air line, wherein the compressed air line is configured to receive a second compressed air supply from an implement compressor via a compressed air connection line, wherein the implement compressor is configured to be mounted on an implement towed by the work vehicle, wherein the compressed air connection line is configured to couple the implement compressor to the compressed air line via a coupler;
    a priority valve coupled to an output of the compressed air line and to an output of the compressed air connection line, wherein the priority valve is configured to enable flow of only the first compressed air supply, only the second compressed air supply, or a combination air supply of the first and second compressed air supplies to the tire inflation system;
    a tire inflation system fluidly coupled to the compressed air line and configured to selectively increase and decrease an air pressure within a tire of the work vehicle, wherein the tire inflation system is configured to distribute the first compressed air supply, the second compressed air supply, and the combination air supply of the first and second compressed air supplies to the tire; and
    a controller configured to:
        determine whether a demand of pneumatic components mounted on the implement exceed a threshold demand level;
        responsive to a determination that the demand of pneumatic components mounted on the implement exceeds the threshold demand level, cause the priority valve to enable flow of only the first compressed air supply to the tire inflation system; and
        responsive to a determination that the demand of the pneumatic components mounted on the implement does not exceed the threshold demand level, cause the priority valve to enable flow of only the second compressed air supply to the tire inflation system or flow of the combination air supply of the first and second compressed air supplies to the tire inflation system.

2. The combination air supply system of claim 1, wherein the tire inflation system comprises a pressure valve and a distribution line extending from an output of the compressed air line and configured to extend to the tire, wherein the pressure valve is disposed along the distribution line and configured to control the increase and decrease of the air pressure within the tire.

3. The combination air supply system of claim 1, comprising an air cooler fluidly coupled to an output of the compressed air line and configured to lower a temperature of the first compressed air supply, the second compressed air supply, or the combination air supply.

4. The combination air supply system of claim 1, wherein the tire inflation system is configured to selectively increase or decrease the air pressure within the tire of the work vehicle to correspond to a target tire pressure, wherein the target tire pressure is based at least in part on a current terrain, load being pulled by the work vehicle, or a combination thereof.

5. The combination air supply system of claim 1, wherein the tire inflation system is configured to selectively increase or decrease an air pressure of another tire of the implement, wherein the tire inflation system is configured to distribute the first compressed air supply, the second compressed air supply, and the combination air supply to the another tire of the implement.

* * * * *